(12) United States Patent
King (10) Patent No.: US 9,288,424 B2
(45) Date of Patent: Mar. 15, 2016

(54) GENERATING A GENRE-BASED VIDEO MOSAIC IN A CABLE SERVICES NETWORK

(75) Inventor: John Kelly King, Asheville, NC (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 1420 days.

(21) Appl. No.: 11/704,697

(22) Filed: Feb. 9, 2007

(65) Prior Publication Data
US 2007/0234388 A1    Oct. 4, 2007

Related U.S. Application Data

(60) Provisional application No. 60/772,431, filed on Feb. 10, 2006.

(51) Int. Cl.
| | |
|---|---|
| H04N 21/482 | (2011.01) |
| H04N 21/431 | (2011.01) |
| H04N 5/445 | (2011.01) |
| H04N 21/2343 | (2011.01) |
| H04N 21/2368 | (2011.01) |
| H04N 21/434 | (2011.01) |
| H04N 21/438 | (2011.01) |

(52) U.S. Cl.
CPC ....... *H04N 5/44543* (2013.01); *H04N 5/44591* (2013.01); *H04N 21/2368* (2013.01); *H04N 21/234363* (2013.01); *H04N 21/4312* (2013.01); *H04N 21/4314* (2013.01); *H04N 21/4341* (2013.01); *H04N 21/4383* (2013.01); *H04N 21/482* (2013.01); *H04N 21/4821* (2013.01)

(58) Field of Classification Search
CPC ............ H04N 5/44543; H04N 21/482; H04N 21/4312; H04N 21/4314; H04N 21/4821
USPC .......... 725/39, 37, 38, 40, 41, 44–45, 47, 48, 725/52, 53, 61
See application file for complete search history.

(56) References Cited

U.S. PATENT DOCUMENTS

| | | | | |
|---|---|---|---|---|
| 5,926,230 | A | * | 7/1999 | Niijima et al. ................. 725/56 |
| 6,020,930 | A | * | 2/2000 | Legrand .......................... 725/41 |
| 6,405,371 | B1 | * | 6/2002 | Oosterhout ........ H04N 5/44543 348/564 |
| 6,918,132 | B2 | * | 7/2005 | Gargi ............................. 725/45 |
| 7,174,126 | B2 | * | 2/2007 | McElhatten et al. ......... 455/3.04 |
| 7,174,512 | B2 | * | 2/2007 | Martin et al. ................. 715/719 |
| 7,900,228 | B2 | * | 3/2011 | Stark et al. ..................... 725/45 |
| 2004/0158870 | A1 | * | 8/2004 | Paxton et al. ................. 725/115 |
| 2007/0157248 | A1 | * | 7/2007 | Ellis ............................... 725/47 |
| 2011/0202960 | A1 | * | 8/2011 | Vaysman et al. .............. 725/41 |

\* cited by examiner

*Primary Examiner* — Benjamin R Bruckart
*Assistant Examiner* — Jason Thomas
(74) *Attorney, Agent, or Firm* — Merchant & Gould (57) ABSTRACT

Methods and systems are provided for generating a genre-based video mosaic from multiple of video sources in a cable services network system. A cable services head end periodically searches a database for a genre descriptor identifying a type of programming broadcast in the cable services network, selects a group of video sources associated with the genre descriptor which are currently being broadcast in the cable services network, and generates a mosaic including the group of video sources associated with the genre descriptor which are currently being broadcast in the cable services network. A set-top box receives the mosaic from the head end, executes an application program enabling a subscriber to selectively tune the video sources in the mosaic, and displays the mosaic on a broadcast channel in the cable services network.

16 Claims, 6 Drawing Sheets

GENERATING A GENRE-BASED VIDEO MOSAIC IN A CABLE SERVICES NETWORK

CROSS-REFERENCE TO RELATED APPLICATIONS

The present application claims priority to U.S. Provisional Application No. 60/772,431, filed Feb. 10, 2006, entitled "Methods And Systems For Generating A Genre-Based Video Mosaic In A Cable Services Network."

BACKGROUND OF THE INVENTION

With the advent of cable services networks, cable subscribers have grown accustomed to receiving a variety of television programming from numerous broadcasting sources. In recent years, technology advances have enabled subscribers to receive an even greater variety of products and services through cable services networks. Modern cable services networks provide traditional video television programming, telephone services, high speed internet access, electronic mail services, video-on-demand, information services, and the like. Through the use of set-top boxes (computing systems), cable services providers can provide interactive television services to subscribers. Such interactive television services allow customers to interact directly with services providers in response to services and product offerings presented to the subscribers through their television sets. For example, in some current cable services networks, subscribers are able to use a set-top box to access a dedicated screen for viewing a call log of missed calls made to a subscriber telephone number.

Unfortunately, current systems do not offer real-time management of telephone calls (e.g., answering calls, forwarding calls, etc.) made to a subscriber telephone number nor are they capable of displaying notifications of incoming calls while a subscriber is viewing television. Because current systems do not offer real-time notification and disposition of telephone calls, a subscriber may miss desired telephone calls. It is with respect to these and other considerations that the present invention has been made.

BRIEF SUMMARY OF THE INVENTION

In accordance with the present invention, the above and other problems are solved by methods and systems for generating a genre-based video mosaic from multiple video sources in a cable services network. The methods and systems enable a cable services head end to automatically group multiple video sources broadcast from the head end according to a genre and to simultaneously display the genre-based group of video sources as a video mosaic on a single broadcast channel in the cable services network.

According to one aspect of the invention, a method is provided for dynamically generating a genre-based video mosaic from a plurality of video sources in a cable services network. The method includes periodically searching a database in a cable services head-end for a genre descriptor. The one genre descriptor identifies a type of programming broadcast in the cable services network. The method further includes, in response to each periodic search of the database, selecting multiple video sources associated with the genre descriptor which are currently being broadcast in the cable services network, and in response to receiving the genre descriptor, generating a mosaic including the multiple video sources associated with the genre descriptor which are currently being broadcast in the cable services network.

Various other aspects of the invention may be implemented by a head end and a set-top box in a cable television services system. The head end is operative to periodically search a database for a genre descriptor identifying a type of programming broadcast in the cable services network, select a group of video sources associated with the genre descriptor which are currently being broadcast in the cable services network, and generate a mosaic including the group of video sources associated with the genre descriptor which are currently being broadcast in the cable services network. The set-top box is operative to receive the mosaic from the head end, execute an application program enabling a subscriber to selectively tune the video sources in the mosaic, and display the mosaic on a broadcast channel in the cable services network.

These and various other features, as well as advantages, which characterize the present invention, will be apparent from a reading of the following detailed description and a review of the associated drawings.

DETAILED DESCRIPTION OF THE INVENTION

Figure 1:
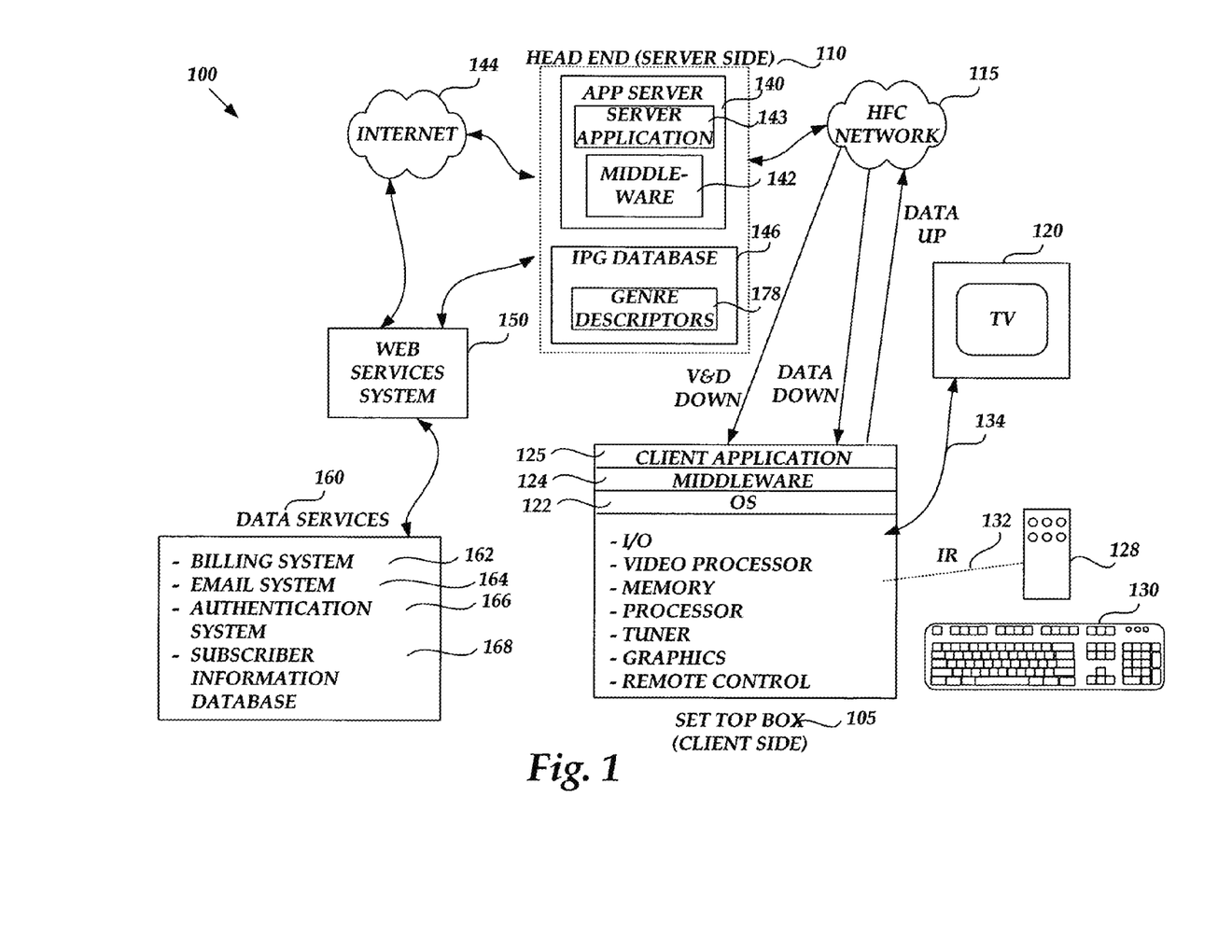
FIG. 1 is a network diagram illustrating a cable services network architecture that serves as an illustrative operating environment for the present invention.

Referring now to the drawings, in which like numerals represent like elements, various embodiments of the present invention will be described. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents. According to an actual embodiment, the present invention is implemented in a cable television/services system in communication with one or more telecommunications sources. FIG. 1 is a block diagram illustrating a cable television/services system architecture (hereinafter referred to as "CATV" system) that serves as an illustrative operating environment for the present invention.

Referring now to FIG. 1, digital and analog video programming, information content and interactive television services are provided via a hybrid fiber coax (HFC) network 115 to a television set 120 for consumption by a cable television/ services system customer. As is known to those skilled in the art, HFC networks 115 combine both optical fiber and coaxial cable lines. Typically, optical fiber runs from the cable head end 110 to neighborhoods of 500 to 2,000 customers. Coaxial cable runs from the optical fiber feeders to each customer. According to embodiments of the present invention, the functionality of the HFC network 115 allows for efficient bidirectional data flow between the client-side set-top box 105 and the server-side application server 140 of the present invention.

According to embodiments of the present invention, the CATV system 100 is in the form of a distributed client-server computing system for providing video and data flow across the HFC network 115 between server-side services providers (e.g., cable television/services providers) via a server-side head end 110 and a client-side customer via a client-side set-top box (set-top box) functionally connected to a customer receiving device, such as the television set 120. As is understood by those skilled in the art, modern CATV systems may provide a variety of services across the HFC network 115 including traditional digital and analog video programming, telephone services, high speed Internet access, video-on-demand, and information services.

On the client side of the CATV system 100, digital and analog video programming and digital and analog data are provided to the customer television set 120 via the set-top box 105. Interactive television services that allow a customer to input data to the CATV system 100 likewise are provided by the set-top box 105. As illustrated in FIG. 1, the set-top box 105 is a multipurpose computing device having a computer processor, memory and an input/output mechanism. The input/output mechanism receives input from server-side processes via the HFC network 115 and from customers via input devices such as the remote control device 128 and the keyboard 130. The remote control device 128 and the keyboard 130 may communicate with the set-top box 105 via a suitable communication transport such as the infrared connection 132. The set-top box 105 also includes a video processor for processing and providing digital and analog video signaling to the television set 120 via a cable communication transport 134. A multi-channel tuner is provided for processing video and data to and from the set-top box 105 and the server-side head end system 110, described below.

The set-top box 105 also includes an operating system 122 for directing the functions of the set-top box 105 in conjunction with a variety of client applications 125. Because a variety of different operating systems 122 may be utilized by a variety of different brands and types of set-top boxes, a middleware layer 124 is provided to allow a given software application to be executed by a variety of different operating systems. According to an embodiment of the present invention, the middleware layer 124 may include a set of application programming interfaces ("APIs") that are exposed to the client applications 125 and operating systems 122 that allow the client applications to communicate with the operating systems through common data calls understood via the API set. As described below, a corresponding middleware layer is included on the server side of the CATV system 100 for facilitating communication between a server-side application server and the client-side set-top box 105. According to one embodiment of the present invention, the middleware layer 142 of the server-side application server 140 and the middleware layer 124 of the client-side set-top box 105 format data passed between the client side and server side according to the Extensible Markup Language ("XML").

The set-top box 105 passes digital and analog video and data signaling to the television 120 via a one-way communication transport 134. The set-top box 105 may receive video and data from the server side of the CATV system 100 via the HFC network 115 through a video/data downlink and data via a data downlink. The set-top box 105 may transmit data from the client side of the CATV system 100 to the server side of the CATV system 100 via the HFC network 115 via one data uplink. The video/data downlink is an "in band" downlink that allows for digital and analog video and data signaling from the server side of the CATV system 100 through the HFC network 115 to the set-top box 105 for use by the set-top box 105 and for distribution to the television set 120. As is understood by those skilled in the art, the "in band" signaling space operates at a frequency between 54 and 860 megahertz. The signaling space between 54 and 860 megahertz is generally divided into 6 megahertz channels in which may be transmitted a single analog signal or a greater number (e.g., up to ten) digital signals.

The data downlink and the data uplink, illustrated in FIG. 1, between the HFC network 115 and the set-top box 105 comprise "out of band" data links. As is understand by those skilled in the art, the "out of band" frequency range generally lies between zero and 54 megahertz. According to embodiments of the present invention, data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client-side STB 105. Operation of data transport between components of the CATV system 100, described with reference to FIG. 1, is well known to those skilled in the art.

Referring still to FIG. 1, the head end 110 of the CATV system 100 is positioned on the server side of the CATV system 100 and includes hardware and software systems responsible for originating and managing content, including broadcast video sources, for distributing through the HFC network 115 to client-side set-top boxes 105 for presentation to customers via televisions 120. The head end includes an interactive programming guide ("IPG") database 146 which information related to video sources (i.e., programming) broadcast in the CATV system 100. The IPG database 146 maintains programming data related to programming offered in the CATV system 100 which is continuously updated over a predefined time period (e.g., seven days, fourteen days, etc.). As will be discussed in greater detail below with respect to FIG. 3, the IPG database 146 the programming data includes genre descriptors 178 which identify the types of programming available (e.g., Sports, News, Reality, Kids, Drama, Music, Religious, Romance, Sci-Fi, Soap Opera, Biography, Adult, etc.). In accordance with the various embodiments of the present invention, server application program 143 in the head end 110 may be configured to periodically search the IPG database 146 for a predefined set of genre descriptors and initiate the generation of a genre-based video mosaic from multiple video sources broadcast in the CATV system 100 for distribution to the set-top box 105 and for presentation to customers via the television 120.

In the head end 110, the application server 140 is a general-purpose computing system operative to assemble and manage data sent to and received from the client-side set-top box 105 via the HFC network 115. In the various embodiments of the present invention, the application server 140 is also operative to execute a server application program 143 for periodically searching the IPG database 146 for programming described by one or more predefined genre descriptors and instruct components in the head end 110 (discussed below with respect to FIG. 2) to dynamically generate a genre-based video mosaic. For example, the server application program 143 may be configured to search the IPG database 146 every ten minutes for Sports programming currently being broadcast in the CATV system 100, compile a list of the Sports programs, and automatically initiate the generation of a video mosaic of Sports programs for transmission to a subscriber set-top box.

As illustrated in FIG. 1, the services provider data services 160 include a number of services operated by the services provider of the CATV system 100 which may include data on a given customer. For example, a billing system 162 may include information such as a customer's name, street address, business identification number, Social Security number, credit history, and information regarding services and products subscribed to by the customer. An electronic mail system 164 may contain information such as electronic mail addresses, high-speed Internet access subscription information and electronic mail usage data. An authentication system 166 may include information such as secure user names and passwords utilized by customers for access to network services.

The subscriber information database 168 may include general information about customers such as place of employment, business address, business telephone number and demographic information such as age, gender, educational level, and the like as well as information about subscribed services such as whether or not a customer has high-speed Internet access, an e-mail account, and premium programming access. As should be understood by those skilled in the art, the disparate data services systems 162, 164, 166, 168 are illustrated as a collection of data services for purposes of example only. The example data services systems comprising the data services 160 may operate as separate data services systems, which communicate with a web services system (described below) along a number of different communication paths and according to a number of different communication protocols.

Referring still to FIG. 1, a web services system 150 is illustrated between the application server 140 and the data services 160 and serves as a collection point for data requested from each of the disparate data services systems comprising the data services 160. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems.

Figure 2:
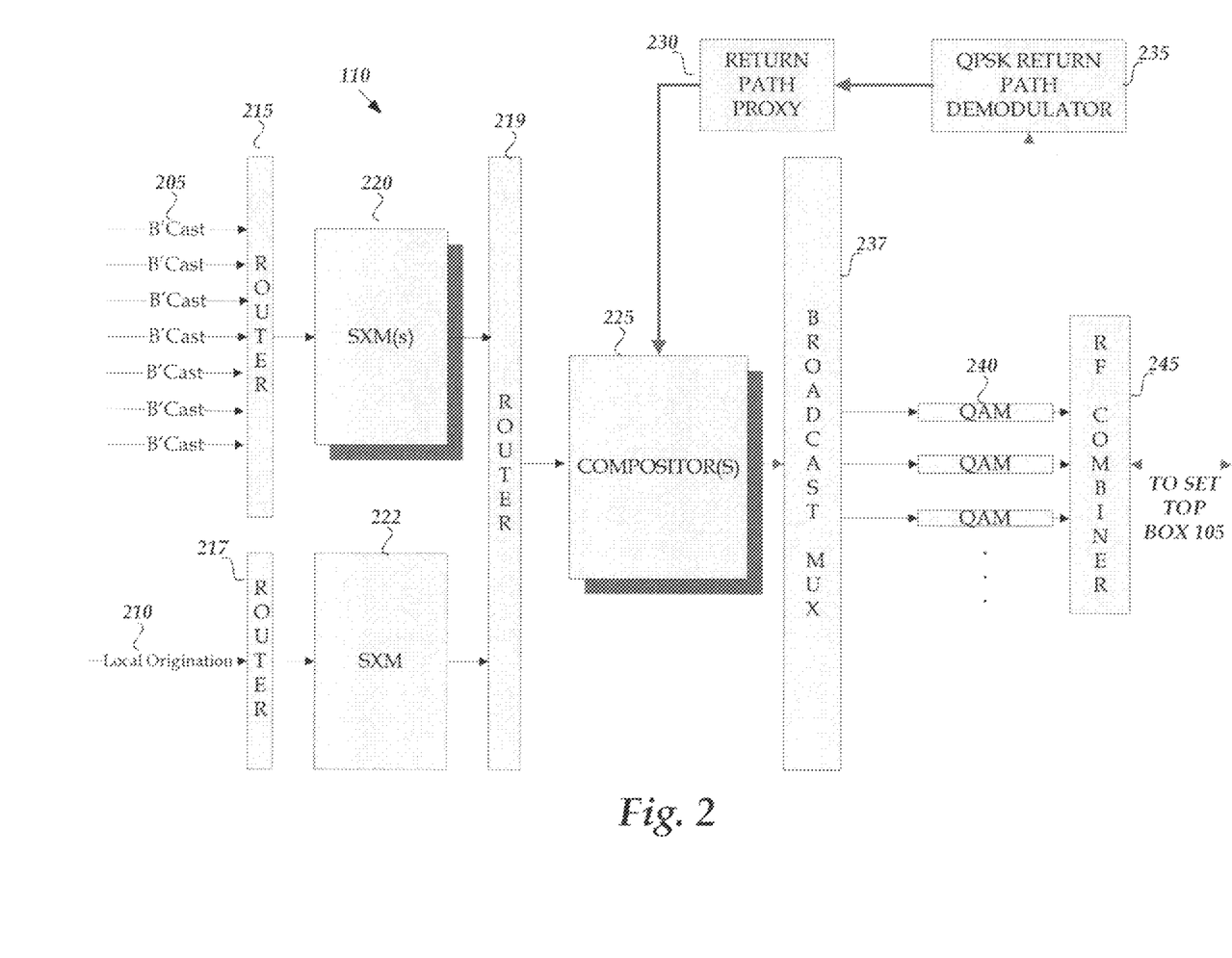
FIG. 2 is a hardware architecture diagram illustrating aspects of the various components and interfaces in a head end of the cable services network architecture of FIG. 1, according to the various embodiments of the present invention.

FIG. 2 is a hardware architecture diagram illustrating aspects of the various components and interfaces in the head end 110 of the CATV system 100 according to the various embodiments of the present invention. Referring now to FIG. 2, the head end 110 includes routers 215 and 217 for receiving multiple broadcast video sources 205, representing programming produced by national television networks, and multiple local origination video sources 210, representing programming produced by the CATV system 100, respectively.

It should be understood that the broadcast video sources 205 may comprise both analog and digital video sources. It should be appreciated that in one embodiment, the head end 110 may include additional hardware (not shown) for converting the analog video sources to digital video via analog-to-digital ("A/D") conversion. Various methods of A/D conversion are well known to skilled in the art. In one embodiment, the digital video sources (either native or converted from analog sources) may be formatted according to the MPEG-2 digital video compression standard although it will be appreciated by those skilled in the art that the digital video sources may be formatted according to other video compression standards, such as MPEG-4, or alternatively the digital video sources may in an uncompressed (i.e., raw) format.

The router 215 multiplexes the video sources 205 into a single video stream and forwards the video stream to a scaling transcoding multiplexer ("SXM") 220. Similarly, the router 217 multiplexes the video sources 210 into a single video stream and forwards the video stream to SXM 222. In one embodiment of the present invention, the multiplexed video streams forwarded to the SXMs 220 and 222 are gigabit Ethernet ("GbE") video streams with each stream including as many as 250 of 3.5 megabits per second quality MPEG-2 bit streams. It will be understood by those skilled in the art that the actual number of bit streams in a GbE stream may vary depending upon various factors including GbE overhead, initial stream bit rates, and the format of the input bit streams. Each of the encapsulated video sources in the multiplexed video streams received by the SXMs 220 and 222 may be identified by format and bit rate.

The multiplexed video streams forwarded by the routers 215 and 217 are attached to the SXMs 220 and 222. The SXMs 220 and 222 are operative to handle multiple input video streams and performs scaling, transcoding (i.e., converting from one format to another), and multiplexing of each input video stream (after being de-multiplexed from the received multiplexed video streams). Each SXM de-multiplexes an input video stream comprising the broadcast video sources 205 and transcodes each of the video sources into a common raw format. In particular, each SXM decodes and decompresses video sources which may have been formatted according to different digital video compression standards (e.g., MPEG-2, MPEG-4, etc.), as necessary. Once each of the video sources has been transcoded into a common format, each SXM then scales the video from each video source from an initial (i.e., full-screen) format into a configurable sized window. For example, a full screen size of 640×480 having 65,536 colors (i.e., 16-bit color) may be scaled down into a video window having a size of 80×60 with 256 colors (i.e., 8-bit color). After the video sources have been scaled into video windows, the SXMs compress each of the video windows into a configurable bit-stream at a configurable bit rate. For example, a video window may be compressed into an MPEG-4 bit-stream at a bit rate of 64 kilobits per second. Each SXM then multiplexes or combines each of the compressed video windows into a single output video stream and transmits the video stream to the compositors 225 (via the router 219). In one embodiment of the present invention, the output video stream is a single GbE connection capable of handling thousands of compressed video streams (e.g., a single GbE connection may include 10,000 video sources at a 64 kilobit per second bit rate).

The compositors 225 are general purpose computers which composite (i.e., select, combine, and if necessary, convert) video sources from the output video streams from the SXMs 220 and 222 into a single video for delivery to a subscriber associated with the set-top box 105. For example, according to one embodiment of the present invention, the compositors 225 may be configured to composite MPEG-4 video sources into a single MPEG-2 (or MPEG-4) video stream. Those skilled in the art will understand that the video sources composited in the compositors 225 may undergo quadrature amplitude modulation ("QAM") via QAM units 240 prior to being communicated to the set-top box 105 via the RF combiner 245. According to the various embodiments of the present invention, the compositors 225 may be instructed by the server application 143 to select and group video sources together into video mosaic streams based on the genre descriptors retrieved from the IPG database 146 and transmit the genre-based video streams (i.e., the mosaic) to the set-top box 105 as will be described in greater detail below with respect to FIG. 4.

Figure 3:
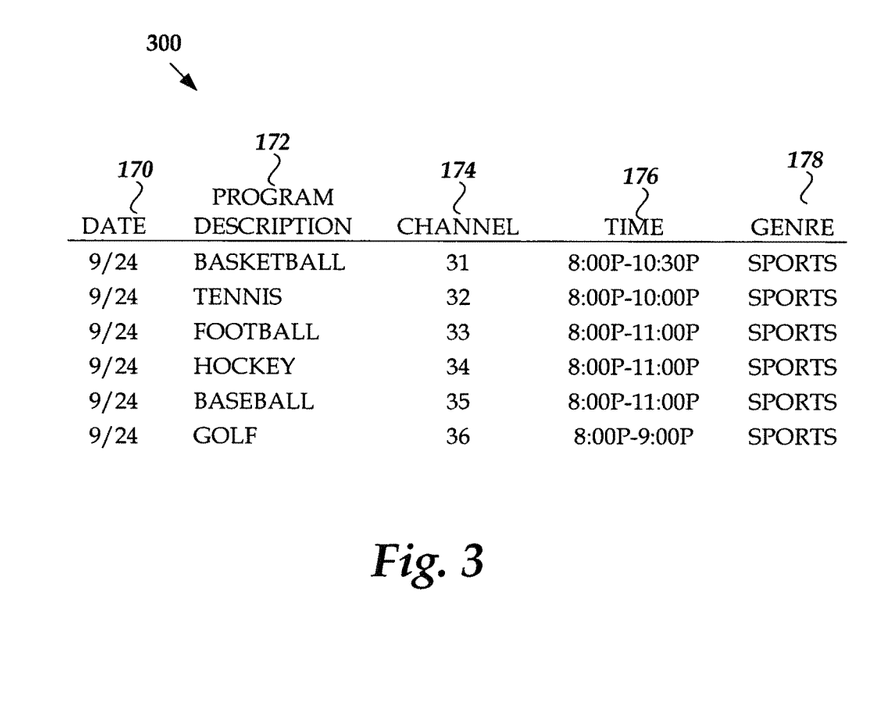
FIG. 3 is a table illustrating genre-based programming data retrieved from a database in a head end of the cable services network architecture of FIG. 1, according to an embodiment of the present invention.

FIG. 3 is a table 300 generated by the server application program 143 illustrating programming data retrieved from the IPG database 146 in accordance with one embodiment of the present invention. The table 300 indicates currently airing programs in the CATV system 100 which correspond to a predefined genre (i.e., Sports) defined in the server application 143. The table 300 includes a Date column 170 indicating the current date, a Program Description column 172 indicating a description of a currently airing program in the CATV system 100, a Channel column 174 indicating the CATV system 100 channel associated with each currently airing program, a Time column 176 indicating the time period each currently airing program will run, and a Genre column 178 indicating the genre for each of the programs in the table 300.

Figure 4:
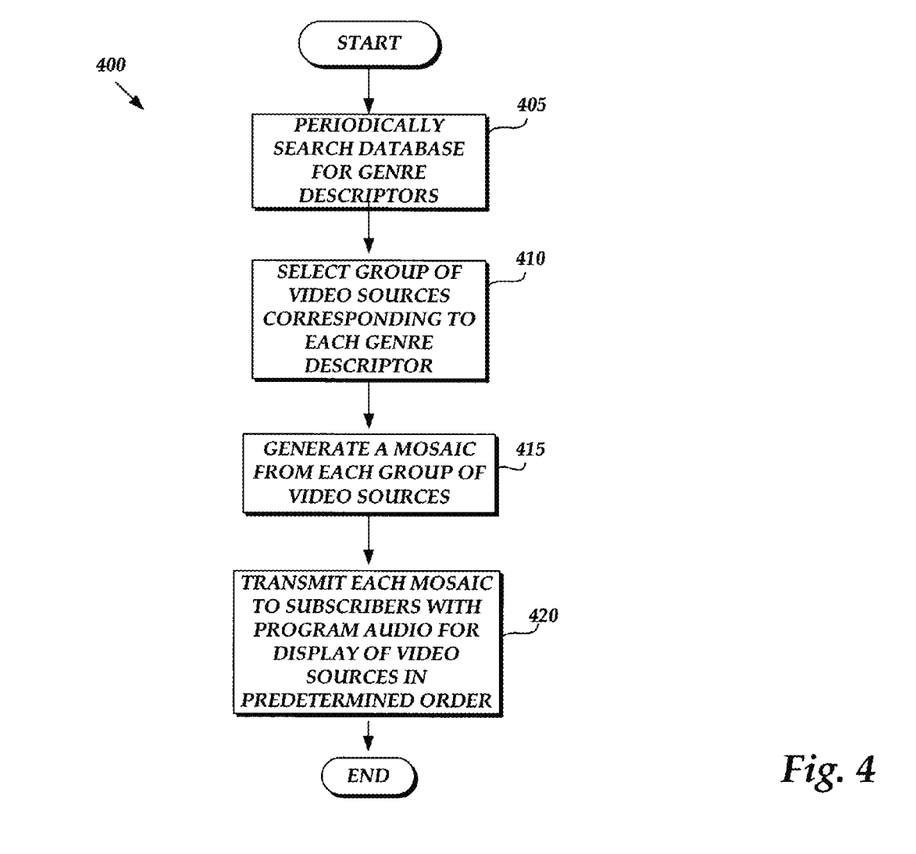
FIG. 4 is a flow diagram showing an illustrative routine for generating a genre-based video mosaic from multiple video sources broadcast in the cable services network architecture of FIG. 1, according to an embodiment of the present invention.

Referring now to FIG. 4, an illustrative routine 400 will be described illustrating a process performed in the head end 110 of the CATV system 100 for dynamically generating a genre-based video mosaic from a plurality of video sources, according to an embodiment of the present invention. The routine 400 begins at operation 405, wherein the server application 143 is executed on the application server 140 in the head end 110 and periodically searches the IPG database 146 for current program guide information and associated genre descriptors. In particular, the server application 143 may search the IPG database 146 based on a fixed number of genre descriptors defined by the CATV system 100 and compile lists of currently airing programs for each genre such as the list shown in the table 300 discussed above in FIG. 3. It will be appreciated that the number of genre descriptors searched for by the IPG database 146 may be limited by the available bandwidth in the CATV system 100. That is, the number of genre descriptors searched for in the IPG database 146 may be limited by the number of available channels for broadcasting mosaics in the CATV system 100.

The routine 400 then continues from operation 405 at operation 410 where the server application program 143 instructs the compositors 225 to select groups of currently airing programs from the video stream received from the SXMs 220 and 222 which correspond to each of the genre descriptors. In particular, the compositors 225 de-multiplex the input video stream received from the SXMs 220 and 222 via the router 219. As discussed above in FIG. 2, the SXMs 220 and 222 convert broadcast and local origination video sources in the CATV system 100 into compressed video windows and multiplex the video windows into a single video stream.

The routine 400 then continues from operation 410 at operation 415 where the compositors 225 generate a mosaic from each of the selected groups of currently airing programs selected from the video stream which correspond to the predefined genre descriptors. In particular, the compositors 225 multiplex the video windows corresponding to each genre descriptor into single output video streams as genre-based mosaics.

The routine 400 then continues from operation 415 at operation 420 where the compositors 225 transmit the genre-based mosaics, including program audio, to a subscriber via the set-top box 105. In particular, the genre-based video mosaics are transmitted to the set-top box 105 which receives the mosaic and broadcasts each of the selected video windows simultaneously on a predetermined broadcast channel for each mosaic in the CATV system 100. It should be understood that the compositors 225 in transmitting the genre-based video mosaics, also transmits audio signals associated with each of the currently airing programs comprising each mosaic, thus enabling a subscriber to listen to program audio while simultaneously viewing a selected video window on the predetermined broadcast channel in the CATV system 100. It should be further understood that the compositors 225 may be instructed by the server application 143 to transmit the currently airing programs comprising each mosaic in a predetermined order (e.g., by channel number, by program title, etc.). The routine 400 then ends.

Figure 5:
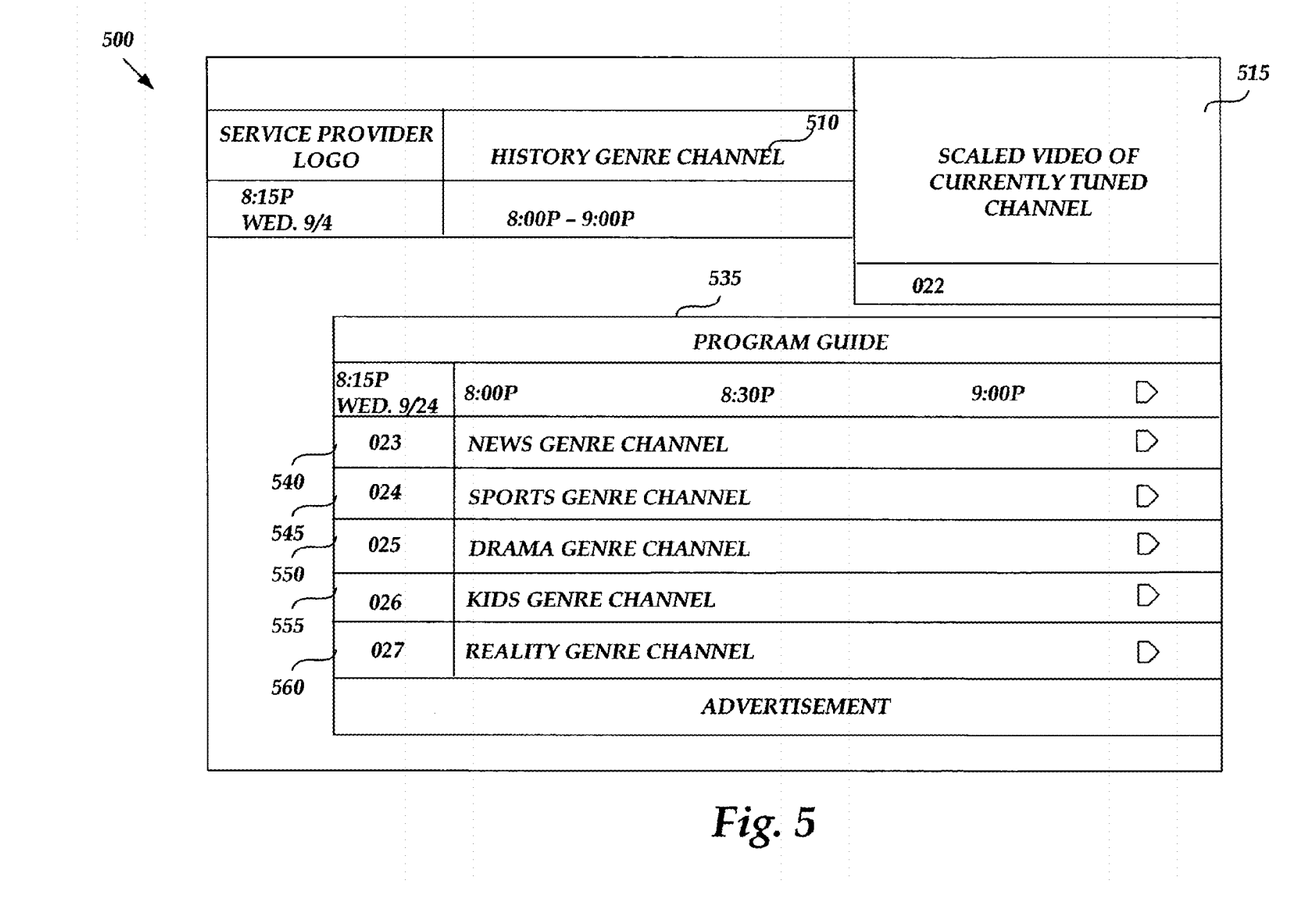
FIG. 5 is a simplified block diagram illustrating a television screen display of a program guide listing genre-based mosaic channels according to an embodiment of the invention.

FIG. 5 is a simplified block diagram illustrating a television screen display of a program guide listing genre-based mosaic channels in the CATV system 100, in accordance with one embodiment of the invention. It should be understood that the layout and content of the television screen displays illustrated in FIGS. 5-6 are for purposes of example only and are not limiting of the variety of different layouts and types of content that may be included in such displays according to illustrative embodiments of the present invention.

Referring now to FIG. 5, the television screen display 500 includes a program guide including a channel description 510 of a currently tuned genre-based video mosaic channel, a scaled video window 515 of the currently tuned channel, and a program guide listing 535 which lists genre-based video mosaic channels 540-560 which may be selected by a subscriber.

Figure 6:
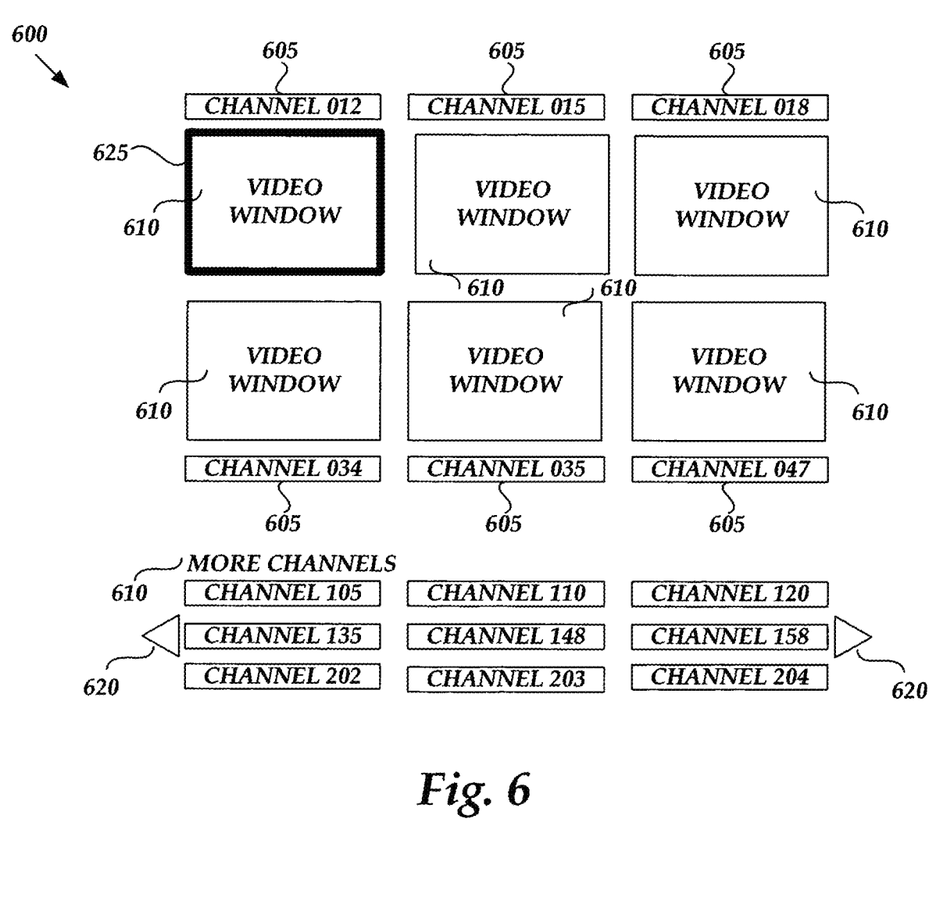
FIG. 6 is a simplified block diagram illustrating a television screen display of a genre-based video mosaic according to an embodiment of the present invention.

Referring now to FIG. 6, the television screen display 600 includes a genre-based video mosaic consisting of video windows 610 which show programming corresponding to a genre descriptor in the IPG database 146 in the CATV system 100. In the mosaic, each of the video windows 610 are identified by channel banners 605 identifying the channels for each of the programs displayed in the video windows 610 in the mosaic. A selection window 625 may be used to select any of the video windows 610 displayed in the mosaic. According to the various embodiments of the present invention, the selection window 625 is a graphical user interface which may be generated by the client applications 125 in the set-top box 105 whenever the tuner is tuned to a mosaic channel. The selection window 625 may be used to move among the displayed video windows 610 using the remote control device 128. It should be understood that once a video window 610 is selected by the selection window 625, the client applications 125 instruct the set-top box 105 to transmit the current audio feed for the currently airing program to the television display device 120. That is, by selecting a video window 610 with the selection window 625, the subscriber not only is able to view the currently airing program stream but also hear the audio which is broadcast with the program in the CATV system 100. It should also be understood that the set-top box client applications 125 may enable the selection window 625 to "tune" to a selected video window 610 as if selecting a channel from a program guide. Once a video window 610 has been tuned, the set-top box 105 generates a full-screen display of the corresponding channel.

The television screen display 600 also includes "More Channels" buttons 615 which are selectable buttons for programs comprising the mosaic whose video windows which will not fit on the television screen display 600. The More Channels buttons 615 may be selected by the remote control device 128 to tune to a selected channel. If the number of More Channels is larger than the space available on the television screen display 600, then scroll buttons 620 may be activated by the set-top box client applications 125 to enable the viewing and selection of the additional channels.

Based on the foregoing, it should be appreciated that the various embodiments of the invention include a methods and systems for generating a genre-based video mosaic from multiple video sources in a cable services network. The methods and systems enable a cable services head end to automatically group multiple video sources broadcast from the head end according to a genre and to simultaneously display the genre-based group of video sources as a video mosaic on a single broadcast channel in the cable services network.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A method of dynamically generating a genre-based video mosaic from a plurality of video sources in a cable services network, comprising:
   periodically searching a database by a server in a cable services head-end for video data related to currently airing video programming matching genre descriptors defined by a cable services operator, the defined genre descriptors identifying types of programming broadcast in the cable services network;
   compiling, by the server, a list of video data related to the currently airing video programming matching the defined genre descriptors for inclusion in video mosaics;
   transforming the list of video data related to the currently airing video programming matching the defined genre descriptors to genre-based mosaic video streams for each of the defined genre descriptors;
   transmitting, from the headend to a subscriber, the genre-based mosaic video streams to the subscriber for presentation on a mosaic video channel of the cable services network;
   automatically updating the genre-based mosaic video streams to include the currently airing video programming found during periodically searching the database by the server in the cable services head-end for video data related to currently airing video programming matching genre descriptors defined by the cable services operator;
   receiving a selection signal from the subscriber for tuning to a program guide channel;
   displaying, on the selected program guide channel, a channel description of a currently tuned genre-based video mosaic channel, a scaled video window of the currently tuned genre-based video mosaic channel and a program guide listing presenting a list of genre-based video mosaic channels according to transmitted genre-based mosaic video streams selectable by a subscriber;
   receiving a selection for one of the genre-based video mosaic channels from the list of genre-based video mosaic channels; and
   displaying the genre-based video mosaic channel selected from the list of genre-based video mosaic channels to simultaneously present video windows in a video mosaic corresponding to currently airing video programming matching a defined genre descriptor associated with the genre-based video mosaic channel selected from the list of genre-based video mosaic channels, wherein the video windows display the currently airing video programming in a scaled format having a reduced number of colors compared to an initial format of the currently airing video programming.

2. The method of claim 1 further comprising broadcasting audio corresponding to a selected video program displayed in a video window.

3. The method of claim 1, wherein the database includes a time period for each of the currently airing video programming.

4. The method of claim 3, wherein periodically automatically updating the genre-based mosaic video streams to include the currently airing video programming occurs at the end of the time period for one or more of the currently airing video programming such that the genre-based mosaic video streams include the currently airing video programming.

5. A system for dynamically generating a genre-based video mosaic from a plurality of video sources in a cable services network, comprising:
   a head-end operative to periodically search a database for video data related to currently airing video programming matching genre descriptors defined by a cable services operator, the defined genre descriptors identifying types of programming broadcast in the cable services network, to compile a list of video data related to the currently airing video programming matching the defined genre descriptors for inclusion in video mosaics, to transform the list of video data related to the currently airing video programming matching the defined genre descriptors to genre-based mosaic video streams for each of the defined genre descriptors and to transmit, from the headend to a subscriber, the genre-based mosaic video streams to a set-top box of the subscriber for presentation on a mosaic video channel of the cable services network, to periodically update the genre-based mosaic video streams to include the currently airing video programming found during periodically searching the database by the server in the cable services head-end for video data related to currently airing video programming matching genre descriptors defined by the cable services operator;
   and a set-top box for receiving a selection signal from the subscriber for tuning to a program guide channel, displaying, on the selected program guide channel, a channel description of a currently tuned genre-based video mosaic channel, a scaled video window of the currently tuned genre-based video mosaic channel and a program guide listing presenting a list of genre-based video mosaic channels according to transmitted genre-based mosaic video streams selectable by a subscriber, receiving a selection for one of the genre-based video mosaic channels from the list of genre-based video mosaic channels and displaying the genre-based video mosaic channel selected from the list of genre-based video mosaic channels to simultaneously present video windows in a video mosaic corresponding to currently airing video programming matching a defined genre descriptor associated with the genre-based video mosaic channel selected from the list of genre-based video mosaic channels, wherein the video windows display the currently airing video programming in a scaled format having a reduced number of colors compared to an initial format of the currently airing video programming.

6. The system of claim 5, wherein the set-top box is operative to receive the genre-based mosaic video streams from the head-end and further operative to execute an application program enabling the selection by the subscriber the video mosaic and to display the video mosaic on at least one broadcast channel in the cable services network.

7. The system of claim 5, wherein the head-end, in periodically searching a database for video data related to currently airing video programming matching genre descriptors defined by a cable services operator, is operative to search a program guide database for metadata identifying the type of programming broadcast in the cable services network.

8. The system of claim 5, wherein the head-end, in transmitting the genre-based mosaic video streams to a set-top box of a subscriber, is operative to transmit each of the video windows for display on the at least one broadcast channel according to a predetermined order.

9. The system of claim 5, wherein the head-end, in transmitting the genre-based mosaic video streams to a set-top box of a subscriber, is operative to broadcast audio corresponding to a selected video window in the video mosaic.

10. The system of claim 5, wherein the set-top box is further operative to display a selection box for tuning to the plurality of video sources in the at least one mosaic a video window in the video mosaic.

11. The system of claim 5, wherein the head-end, in transmitting the genre-based mosaic video streams to a set-top box of a subscriber, transmits each of the video windows for display on the at least one broadcast channel according to a predetermined order.

12. The system of claim 11, wherein the head-end, in transmitting the genre-based mosaic video streams to a set-top box of a subscriber, periodically updates the genre-based mosaic video streams occurs at the end of the time period for one or more of the currently airing video programming such that the genre-based mosaic video streams include the currently airing video programming.

13. An application server to dynamically generate a genre-based video mosaic from a plurality of video sources in a cable services network by:
    periodically searching a database in a cable services head-end for video data related to currently airing video programming matching genre descriptors defined by a cable services operator, the searching including searching a program guide database for metadata identifying the type of programming broadcast in the cable services network, the defined genre descriptors identifying types of programming broadcast in the cable services network;
    compiling a list of video data related to the currently airing video programming matching defined genre descriptors for inclusion in video mosaics;
    transforming, from the headend to a subscriber, the list of video data related to the currently airing video programming matching the defined genre descriptors to genre-based mosaic video streams for each of the defined genre descriptors on a mosaic video channel of the cable services network by multiplexing a plurality of video sources associated with the defined genre descriptors;
    transmitting the genre-based mosaic video streams to the subscriber for presentation on a mosaic video channel of the cable services network;
    automatically updating the genre-based mosaic video streams to include the currently airing video programming found during periodically searching the database by the server in the cable services head-end for video data related to currently airing video programming matching genre descriptors defined by the cable services operator;
    receiving a selection signal from the subscriber for tuning to a program guide channel;
    displaying, on the selected program guide channel, a channel description of a currently tuned genre-based video mosaic channel, a scaled video window of the currently tuned genre-based video mosaic channel and a program guide listing presenting a list of genre-based video mosaic channels according to transmitted genre-based mosaic video streams selectable by a subscriber;
    receiving a selection for one of the genre-based video mosaic channels from the list of genre-based video mosaic channels; and
    displaying the genre-based video mosaic channel selected from the list of genre-based video mosaic channels to simultaneously present video windows in a video mosaic corresponding to currently airing video programming matching a defined genre descriptor associated with the genre-based video mosaic channel selected from the list of genre-based video mosaic channels, wherein the video windows display the currently airing video programming in a scaled format having a reduced number of colors compared to an initial format of the currently airing video programming.

14. The application server of claim 13, wherein the database includes a time period for each of the currently airing video programming.

15. The application server of claim 13, wherein initial format of the currently airing programming is in 16-bit color and the scaled format of the currently airing programming is in 8-bit color.

16. The application server of claim 14, wherein periodically automatically updating the genre-based mosaic video streams to include the currently airing video programming occurs at the end of the time period for one or more of the currently airing video programming such that the genre-based mosaic video streams include the currently airing video programming.

* * * * *